US012654651B2

(12) United States Patent 
Martinez Sanchez

(10) Patent No.: US 12,654,651 B2 
(45) Date of Patent: Jun. 16, 2026

(54) METHOD AND SYSTEM FOR ACCESS CONTROL

(71) Applicant: EXPERT SECURITY LIMITED, Dublin (IE)

(72) Inventor: Juan Francisco Martinez Sanchez, Cork (IE)

(73) Assignee: Expert Security Limited, Dublin (IE)

( * ) Notice: Subject to any disclaimer, the term of this patent is extended or adjusted under 35 U.S.C. 154(b) by 0 days.

(21) Appl. No.: 18/620,886

(22) Filed: Mar. 28, 2024

(65) Prior Publication Data

US 2025/0001971 A1 Jan. 2, 2025

Related U.S. Application Data

(63) Continuation-in-part of application No. 17/600,063, filed as application No. PCT/EP2020/058976 on Mar. 30, 2020, now Pat. No. 11,978,293.

(30) Foreign Application Priority Data

Mar. 29, 2019 (GB) ...................................... 1904438

(51) Int. Cl.
*B60R 25/24* (2013.01)
*G07C 9/00* (2020.01)

(52) U.S. Cl.
CPC ........ *B60R 25/245* (2013.01); *G07C 9/00309* (2013.01); *G07C 2009/00793* (2013.01); *G07C 2009/00809* (2013.01); *G07C 2009/00984* (2013.01); *G07C 2209/63* (2013.01)

(58) Field of Classification Search
None
See application file for complete search history.

(56) References Cited

U.S. PATENT DOCUMENTS 5,204,672 A * 4/1993 Brooks ................... G07C 9/28
340/426.36
5,796,827 A * 8/1998 Coppersmith ... G06K 19/07758
455/100

(Continued)

*Primary Examiner* — Carlos Garcia 
(74) *Attorney, Agent, or Firm* — Berkeley Law & Technology Group, LLP

(57) ABSTRACT

Disclosed is a method for access control, that may include detecting a tactile or a proximity action by a body on a sensor of an electronic device, wherein the electronic device operates in first and second operating modes upon detection of the tactile and proximity actions, respectively. The method may further include generating by the electronic device, first and second signals in first and second operating modes respectively, wherein the each of first and second signals is a very low frequency/low frequency (VLF/LF) electromagnetic signal. The method may further include transmitting the first signal from the electronic device to a receiver through direct touch between a touch panel and the body, or transmitting the second signal from the electronic device to the receiver through air, wherein the receiver is located in close proximity to the body; receiving by the electronic device, a signal in response to said first or second signals from the receiver. The method may further include performing one or more actions by the electronic device, in response to said received signal.

11 Claims, 8 Drawing Sheets

(56) References Cited

U.S. PATENT DOCUMENTS

| | | | | |
|---|---|---|---|---|
| 8,867,995 | B2 * | 10/2014 | Kim | H04M 1/72412 |
| | | | | 709/248 |
| 11,154,275 | B2 * | 10/2021 | Gu | A61B 8/14 |
| 2004/0142732 | A1 * | 7/2004 | Ueda | G01V 15/00 |
| | | | | 455/344 |
| 2007/0191998 | A1 * | 8/2007 | Arie | G07C 9/00309 |
| | | | | 701/2 |
| 2008/0158432 | A1 * | 7/2008 | Hwang | H01Q 1/44 |
| | | | | 348/725 |
| 2011/0306303 | A1 * | 12/2011 | Choi | G06F 3/011 |
| | | | | 455/66.1 |
| 2015/0162994 | A1 * | 6/2015 | Rodzevski | G06F 21/34 |
| | | | | 455/39 |
| 2016/0375861 | A1 * | 12/2016 | Miyazawa | B60R 25/245 |
| | | | | 701/2 |
| 2018/0312020 | A1 * | 11/2018 | Saburi | B60C 23/0461 |
| 2018/0341848 | A1 * | 11/2018 | Breuer | G06N 3/02 |
| 2021/0362678 | A1 * | 11/2021 | Jin | G01D 5/24 |
| 2022/0189225 | A1 * | 6/2022 | Martinez Sanchez | |
| | | | | B60R 25/2027 |
| 2024/0237934 | A1 * | 7/2024 | Hwang | A61B 5/327 |
| 2025/0001971 | A1 * | 1/2025 | Martinez Sanchez | |
| | | | | G07C 9/00309 |

* cited by examiner

301

DETECTING A TACTILE ACTION BY A BODY ON A TACTILE SENSOR;

302

TRANSMITTING A FIRST SIGNAL IN RESPONSE TO SAID DETECTION OF TACTILE ACTION THROUGH SAID BODY;

303

RECEIVING A SECOND SIGNAL IN RESPONSE TO SAID FIRST SIGNAL; AND

304

DISENGAGING OR ENGAGING A LOCK IN RESPONSE TO SAID RECEIVED SECOND SIGNAL

402

Panel Device
(dual mode)

400

401

Key Fob Device
(active tag)

METHOD AND SYSTEM FOR ACCESS CONTROL

FIELD

The present disclosure relates to a method and system for access control and interaction/activity monitoring. More specifically the present disclosure relates to locking or unlocking of a door or an entrance or provides access to a user.

BACKGROUND

It is well known that radio frequency key fobs are used for granting access e.g. by opening a door. A user is required to press a lock/unlock button and such an action causes the key fob to transmit or establish communication with the access controller. If the key fob is duly authorized by the access controller, access is granted to the user. Hence, a user is required to press a button to activate the key fob to begin the process of gaining access. This may be cumbersome and difficult in scenarios where both of the user's hands are busy e.g. holding shopping bags, etc. Therefore, it is desirable to have a method and system which overcomes the above problem as well as introducing a more inclusive and secure technical solution to facilitate access for people with various types of mobility issues and/or disabilities.

A person skilled in the art would appreciate that devices based on capacitive or inductive coupling either require a wearable or an implant. However, such limitations cause additional inconvenience to a user. Further, air-gaps between the key fob and the body shall have a huge impact on the performance of the device when based on capacitive or inductive coupling.

WO2010/067390 discloses communications between a mobile device and a fixed device using a single bidirectional channel where the human body is an extension of the receiver antenna.

Numerous other patent publications exist in the art for providing an access control system in which a door controller, reader or lock or the like communicates with a mobile key (or fob) via Radio Frequency (RF) signals. For example, European patent publication number EP 2 608 158 discloses a system with Intrabody and RF communications between a biometric reader and a wearable/portable device. This system relies on intrabody capacitive communication so that capacitive coupling is used for the intrabody communication, where direct contact is mentioned when interacting with the reader device and also when describing the wearable device. French patent publication number FR3022092 discloses a system that uses a combination of Near Field Communications (NFC) and RF communications. U.S. Pat. No. 5,796,827 is another device that is based on the contact or close proximity for operation resulting in a very limited distance due to contact or coupling to perform communications.

Hence, there is an unresolved need for a method and system for access control which solves the above mentioned technical problems of the art.

SUMMARY

The present disclosure, as set out in the appended claims, is directed to a method and system for access control. The system for access control comprises an electronic lock and an electronic key fob.

In one implementation the electronic lock comprises means for detecting a tactile action by a user's body on a tactile sensor/conductive element, means for transmitting a first signal through said body in response to said detection of tactile action, means for receiving a second signal in response to said first signal and means for disengaging or engaging a lock in response to said received second signal. The first signal is transmitted through the body wherein said body causes said tactile action.

The means for transmitting the first signal comprises a very low or low frequency wireless transceiver (VLF/LF) and the body acts as an antenna and/or transmission media for transmitting said first signal.

The means for receiving the second signal comprises an ultra-high frequency (UHF) or a super high frequency (SHF) wireless transceiver. In an implementation means for receiving the second signal comprises a Bluetooth™ protocol transceiver or any other suitable RF technology system.

Implementations may use a multi radio approach for access control communications between a reader and a remote device (wearable/portable) whereas one of the signals, used as wake up command identification (ID), travels through the human body and reaches the remote device, enabling a secondary radio communications. The secondary communication channel is typically an SHF or UHF signal.

Suitably an implementation of a method and system may use the body as an extended antenna for transmission of the wake up command ID when in contact with the reader. This signal used for body communications is VLF/LF. The human body irradiates a very short range field that is picked up by the wearable/portable device through a resonant receiver. Using this approach the range of the portable device can be extended to a portable device that the user may carry in a bag, handbag or backpack and not just the typical wearable device like a watch.

In one implementation the electronic key fob comprises means for receiving a first electromagnetic signal in the very low or low frequency bands (VLF/LF), said first signal transmitted through a body in contact with a transmitter of said first electromagnetic signal and means for transmitting a second electromagnetic signal in response to receipt of said first electromagnetic signal. The means for receiving the first signal comprises a very low or low frequency (VLF/LF) wireless transceiver. The means for transmitting the second signal comprises an ultra high frequency or a super high frequency wireless transceiver. In an implementation the means for transmitting the second signal comprises a Bluetooth™ protocol transceiver or any other suitable RF technology system.

In one implementation the method comprises the steps of detecting, by the electronic lock a tactile action by a body on a tactile sensor and the electronic lock transmitting a first signal using very low frequency band (VLF/LF) in response to said detection of tactile action through said body. The electronic key fob receives the first electromagnetic signal, where the first signal is transmitted through a body in contact with a transmitter of said first electromagnetic signal i.e. the electronic lock.

In one implementation the electronic lock is a lock for a car or vehicle door or boot of a car or vehicle.

Further, the electronic key fob transmits a second electromagnetic signal in response to receipt of said first electromagnetic signal. The electronic lock receives the second signal in response to said first signal and disengages or engages a lock in response to said received second signal.

The second signal is an ultra-high frequency electromagnetic signal or a super high frequency electromagnetic signal.

It will be appreciated that the disclosed technology does not necessarily focus on new cyphering methods. Implementations may use of Bluetooth protocol security and adds an extra layer by using a secondary unique ID that triggers the Bluetooth communications to happen in a very short range. Implementations of systems and/or methods may be relatively more secure in the sense that a portable device is effectively off (deep sleep) until the touch event occurs. Through the touch event a VLF/LF signal is transmitted through the human body on contact with the reader. Until this wake-up signal is received, the portable device is on standby, without broadcasting any information on Bluetooth or any other radio.

In one implementation a RF communication interface module is provided configured for the primary wake-up signal that allows the secondary bidirectional communication to occur. The frequencies used can vary from 1 Hz to 150 kHz (VLF/LF), being around 25 kHz to 30 kHz in most use cases. Prior art systems that claimed intrabody communications, work in the LF domain only (usually 125-150 kHz). By reducing the frequencies to the VLF domain, around or below 30 kHz, it was proven that a tighter control of distance, due to amount of field radiated by the body in relation to lower frequencies resulting in longer wavelengths to be achieved.

In one implementation a RF communication interface module is provided, on the receiver side (portable device), and comprises the capability of using one, two or three antennae elements. In this case by strategic physical placement of the same, the receiver is able to discriminate the direction in which the filed has been received. This information can add valuable information about the relative placement and orientation of the device in relation to the target to avoid false triggers that may occur, for example by placing the receiver too close to the reader from the inside of an access controlled door/gate, in such a way that a touch event from the outside could, with some sort of passive amplification, allow the receiver to wake-up and perform an unintended successful authentication event, granting access to a user that should not be granted access.

In an implementation, there may be provided a method for access control that may include detecting a tactile or a proximity action by a body on a sensor of an electronic device, wherein the electronic device operates in a first operating mode upon detection of the tactile action, and operates in a second operating mode upon detection of the proximity action; generating by the electronic device, a first signal in the first operating mode, and a second signal in the second operating mode, wherein the each of first and second signals may be a very low frequency/low frequency (VLF/LF) electromagnetic signal; transmitting the first signal from the electronic device to a receiver through direct touch between a touch panel and the body in the first operating mode, or transmitting the second signal from the electronic device to the receiver through air in the second operating mode, wherein the receiver may be located in close proximity to the body; receiving by the electronic device, a signal in response to said first or second signals from the receiver; and performing one or more actions by the electronic device, in response to said received signal.

In an implementation, said body acts as an antenna and/or conductive media for transmitting said first signal to the receiver.

In an implementation, the electronic device comprises an electronic lock that may be engaged or disengaged in response to said received signal from an electronic key fob.

In an implementation, the first signal may be transmitted by the touch panel of the electronic device, to an antenna of the receiver through capacitive coupling with the body.

In an implementation, the second signal may be transmitted by an antenna of the electronic device to an antenna of the receiver directly through air.

In an implementation, the electronic device remains in sleep mode, and wakes up upon detection of a proximity or touch action by the body.

In an implementation, the electronic device may include a touch panel formed of a metal electrode plate for detecting the tactile action, and transmitting the first signal upon detection of the tactile action.

In an implementation, the electronic device may include a signal conditioning and amplifier for performing signal conditioning and amplification of the second signal.

In an implementation, there may be provided a system for access control. The system may include an electronic device that may include a sensor for detecting a tactile or a proximity action by a body on the sensor, wherein the electronic device operates in a first operating mode upon detection of the tactile action, and operates in a second operating mode upon detection of the proximity action. The electronic device may further include a VLF/LF generator for generating very low frequency/low frequency (VLF/LF) electromagnetic signal, and a microcontroller configured to: enable the VLF/LF generator to generate the first signal in the first operating mode, and generate the second signal in the second operating mode; and enable a touch panel to transmit the first signal to a receiver through direct touch between the touch panel and the body, or enable an antenna to transmit the second signal to the receiver through air, wherein the receiver may be located in close proximity to the body. The system further may include an electronic key fob that may include a VLF/LF transceiver for generating a signal in response to said first or second signals from the electronic device, wherein the electronic device performs one or more actions, in response to said generated signal.

In an implementation, the sensor may include the touch panel formed of a metal electrode plate for receiving the tactile or proximity action, and a touch controller coupled with the touch panel for detecting the tactile or proximity action, and transmitting the detected action to the microcontroller.

In an implementation, the system may further include first switch between the microcontroller and the touch panel, wherein the microcontroller enables the first switch for transmission of the first signal through the touch panel in the first operating mode, and second switch between the touch controller and the antenna, wherein the microcontroller enables the second switch for transmission of the second signal through the antenna in the second operating mode.

An implementation can use Bluetooth or Sug-Giga RF (e.g. 433 MHz) or any other RF technology for short range bidirectional communication and authentication. In this case the RF communication interface relates to the secondary signal mentioned above whereas secure authentication occurs to grant access to the user. In the case of Bluetooth, typical 2.4 Ghz is the frequency used. In the case of using Sub-Giga RF communications the frequencies may vary depending on the licensing of the ISM spectrum in determined geographical regions. Sub-GiGa RF operates in the ISM spectrum bands below 1 Ghz—typically in the 769-935

MHz, 315 Mhz and the 468 Mhz frequency range. This spectrum band below 1 Ghz is particularly useful for RF IOT applications.

Thereby, implementations may provide a method and system for access control which overcomes the problems identified above while also being able to monitor activities and/or interactions between the technology enabled device and the end user that carries the portable device.

There is also provided a computer program comprising program instructions for causing a computer program to carry out the above method which may be embodied on a record medium, carrier signal or read-only memory.

BRIEF DESCRIPTION OF THE DRAWINGS

Implementations may be more clearly understood from the following description of an implementation thereof, given by way of example only, with reference to the accompanying drawings, in which.

DETAILED DESCRIPTION OF THE DRAWINGS

Figure 1:
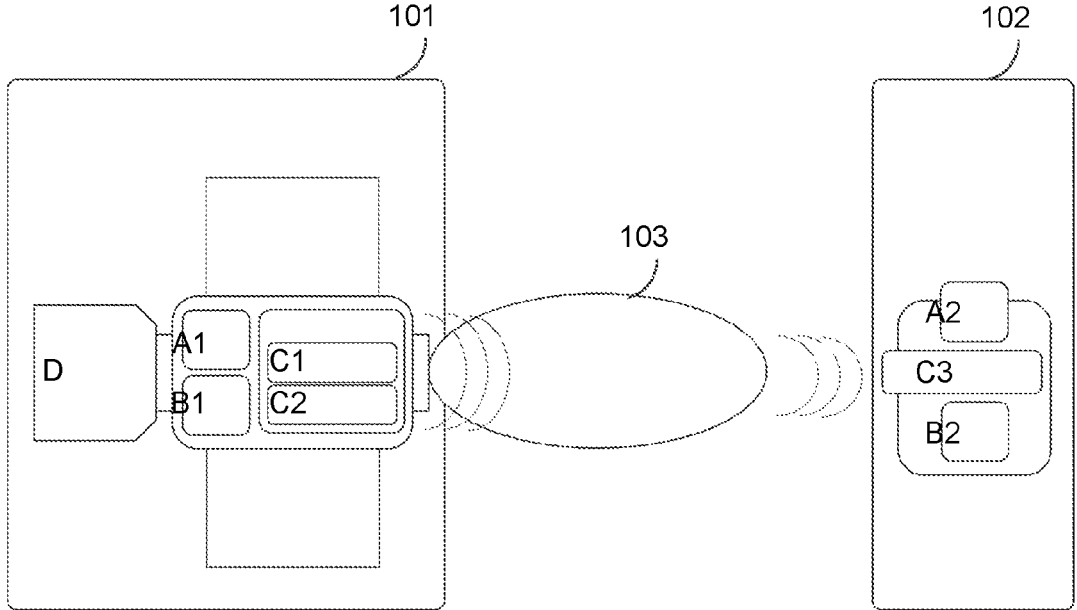
FIG. 1 exemplarily illustrates the components of a system for access control.

Implementations may provide a method and system for access control. FIG. 1 exemplarily illustrates the components of a system for access control. The system for access control comprises an electronic lock 101 and an electronic key fob 102. A predefined signal (with certain modulation and encoding) is generated by the electronic lock 101 and transmitted through a conductive element, which may be a cylinder of the electronic lock 101. In order to lock or unlock the electronic lock 101, a user touches an exposed portion of the electronic lock 101, which causes the predefined signal to travel through the user's body 103. In other words the user's body acts as an antenna and/or medium for the transmission of the predefined signal depending on the location of the receiver device. The predefined signal is received by an electronic key fob 102 placed in close proximity to the user's body (pocket, pendant, belt, or in a backpack or handbag carried by the user). When in close proximity to the body, e.g. pocket, it can be considered that body coupling between the user and the portable device occurs; however, when within a certain distance from the user's body, e.g. backpack, the receiver is able to read the electromagnetic signal that the human body irradiates, behaving like an antenna.

Once the predefined signal is received by electronic key fob 102, the electronic key fob 102 wakes up a secondary encrypted and secured radio which then performs the necessary communication with the electronic lock 101 which results in an actuation event to occur e.g. the electronic lock actuates a lever to allow access to a door. For this secondary radio, i.e. Bluetooth, different levels of authentication can be implemented as required by the end application, while also taking advantage of the RSSI of the received signal to identify the distance at which the user might be from the lock that is trying to unlock in order to discriminate from false and/or unintentional events.

Figure 2:
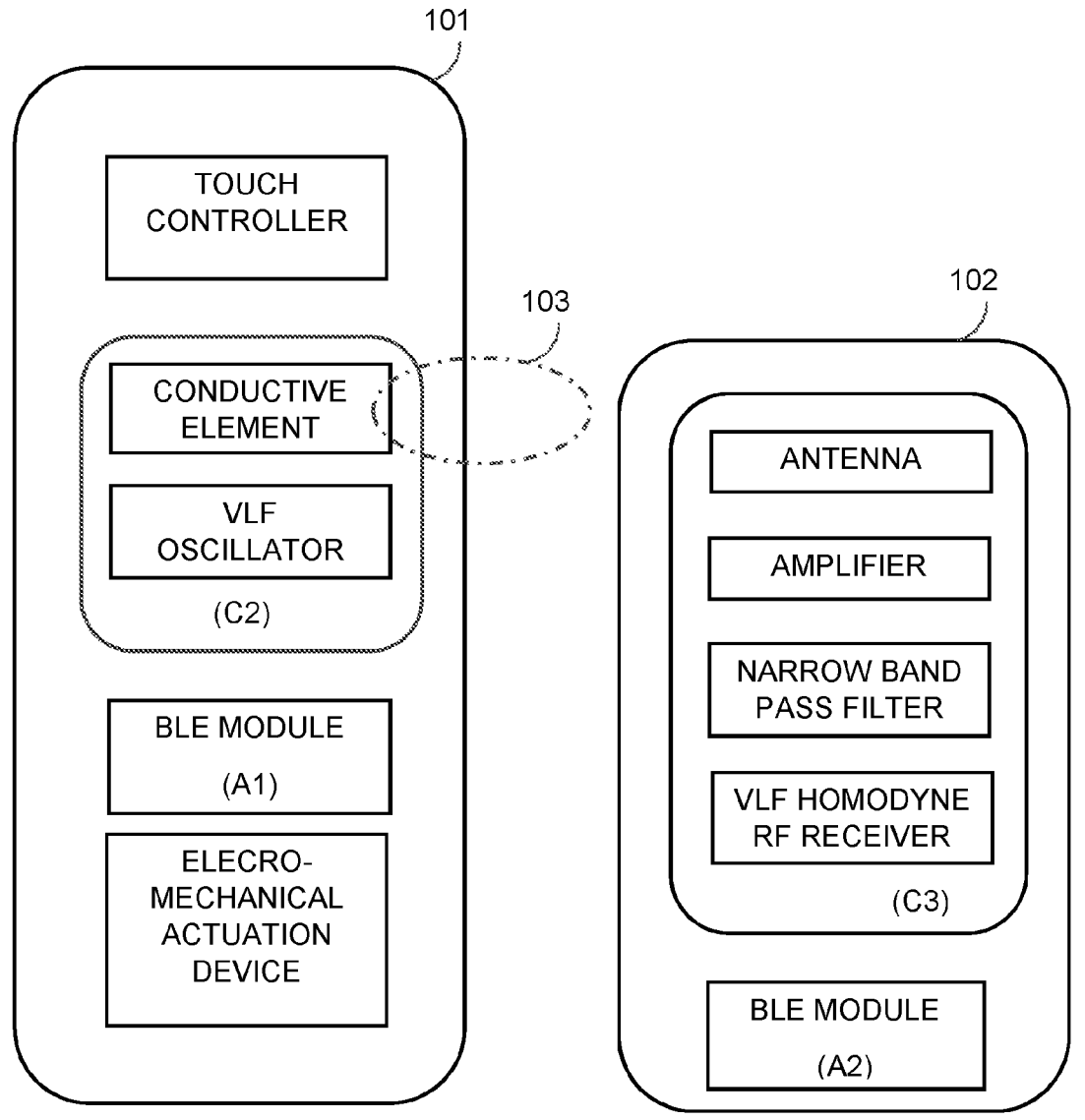
FIG. 2 is a functional block diagram exemplarily illustrating the primary components of the system for access control.

FIG. 2 is a functional block diagram exemplarily illustrating the primary components of the system for access control.

The electronic lock 101, comprises a touch controller C1, a conductive element coupled to a very low or low frequency (VLF/LF) transmitter C2, a Bluetooth™ low energy (BLE) module A1 and an electro-mechanical actuation device D. The conductive element in cooperation with the touch controller C1 detects a tactile action by a user's body 103 on the conductive element. Once the tactile action is detected, the VLF/LF transmitter coupled to the conductive element, transmits a first signal through said user's body i.e. the body acts as an antenna for transmitting said first signal. A second signal is received by the BLE module A1 in response to said first signal and an electro-mechanical actuation device D disengages or engages a lock in response to said received second signal. In an implementation the first signal is transmitted by a very low frequency wireless transceiver. In another implementation, the second signal receiving means comprises an ultra-high frequency or a super high frequency wireless transceiver.

The electronic key fob 102, comprises a VLF/LF transceiver C3 for receiving a first electromagnetic signal in the very low and low frequency band, said first signal transmitted through a body in contact with a transmitter of said first electromagnetic signal and a BLE module A2 for transmitting a second electromagnetic signal in response to receipt of said first electromagnetic signal.

The VLF/LF transceiver C3 comprises an antenna/ae, amplifier, a narrow bandpass filter and a VLF/LF RF receiver and/or homodyne SDR, where the VLF/LF transceiver is configured to detect or receive the transmitted first signal. This can be achieved through a very simple SDR implemented at a microcontroller level using homodyne detection, but also through any custom or integrated instrumentation discrete solution.

In an implementation, the electronic key fob 102 comprises an ultra-high frequency or a super high frequency wireless transceiver for transmitting the second signal. In an implementation the means for transmitting the second signal comprises a Bluetooth™ protocol transceiver.

The working of the above components is described in detail in the following paragraphs.

The conductive element in communication with the touch controller wakes up for a few milliseconds every second from a standby state to poll for a touch event to occur. Once, a tactile action is detected on the conductive element/tactile sensor i.e. once a user touches the conductive element of the electronic lock 101 using his/her fingers a tactile action is detected.

Once a tactile action is detected, the VLF/LF oscillator or a VLF/LF transceiver wakes up and transmits a VLF/LF modulated signal comprising a predefined identifier of the electronic lock 101. The VLF/LF modulated signal via the conductive element travels through the body of the user who is in direct contact with the conductive element of the electronic lock 101. The VLF/LF transceiver C3 of the electronic key fob 102 receives the VLF/LF modulated signal. In other words, the electronic lock 101 transmits a first signal using very low frequency band in response to said detection of tactile action through said body 103. The electronic key fob 102 receives the first electromagnetic signal, where the first signal is transmitted through a user's body 103 in contact with a transmitter of said first electromagnetic signal i.e. the conductive element of the electronic lock 101.

The electronic key fob 102 further verifies as to whether the electronic key fob 102 matches with the electronic lock 101 by comparing the received identifier of the electronic lock 101. Upon successful verification, the Bluetooth module A2 of the electronic key fob 102 wakes up to transmit lock engage/disengage signal to the Bluetooth module A1 of the electronic lock 101. A person skilled in the art would appreciate that the electronic lock 101 and the electronic key fob 102 are previously paired. In other words, the electronic key fob transmits a second electromagnetic signal in response to receipt of said first electromagnetic signal. The electronic lock receives the second electromagnetic signal in response to said first signal and disengages or engages a lock in response to said received second signal. The second signal is an ultra-high frequency electromagnetic signal or a super high frequency electromagnetic signal.

Figure 3:
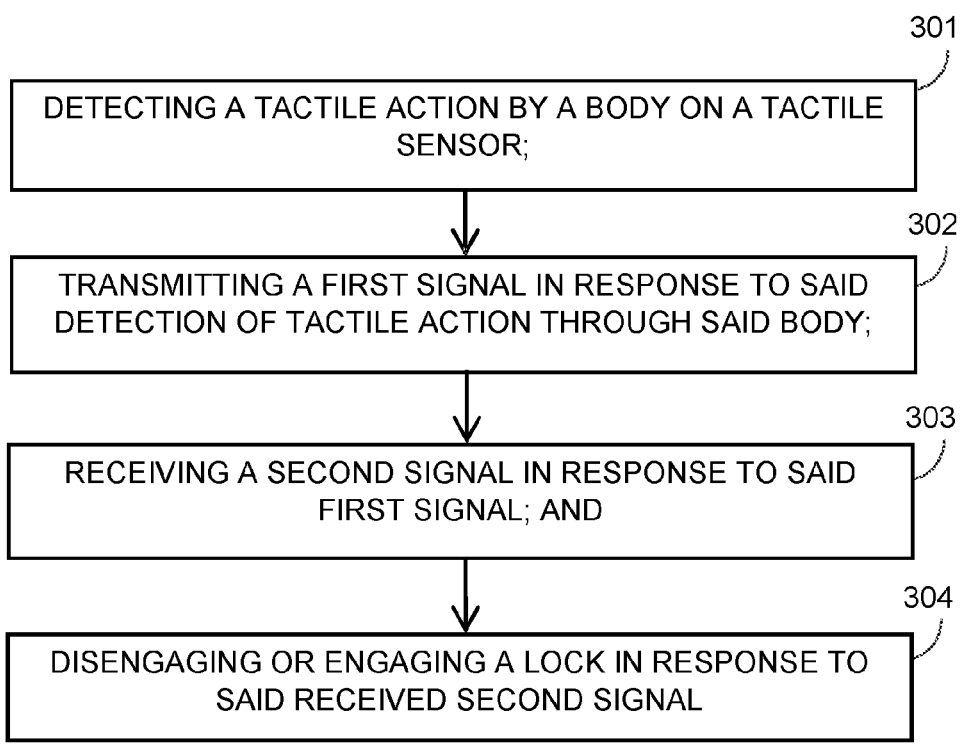
FIG. 3 is a flowchart of the method for access control, according to an implementation.

FIG. 3 is a flowchart of the method for access control. As disclosed above, the method comprises detecting 301, by the electronic lock a tactile action by a body on a tactile sensor. The electronic lock transmitting 302 a first signal using very low frequency band in response to said detection of tactile action through said body. The electronic key fob receives the first electromagnetic signal, where the first signal is transmitted through a body in contact with a transmitter of said first electromagnetic signal i.e. the electronic lock. Further, the electronic key fob transmits a second electromagnetic signal in response to receipt of said first electromagnetic signal. The electronic lock receives 303 the second signal in response to said first signal and disengages or engages 304 a lock in response to said received second signal.

Figure 4:
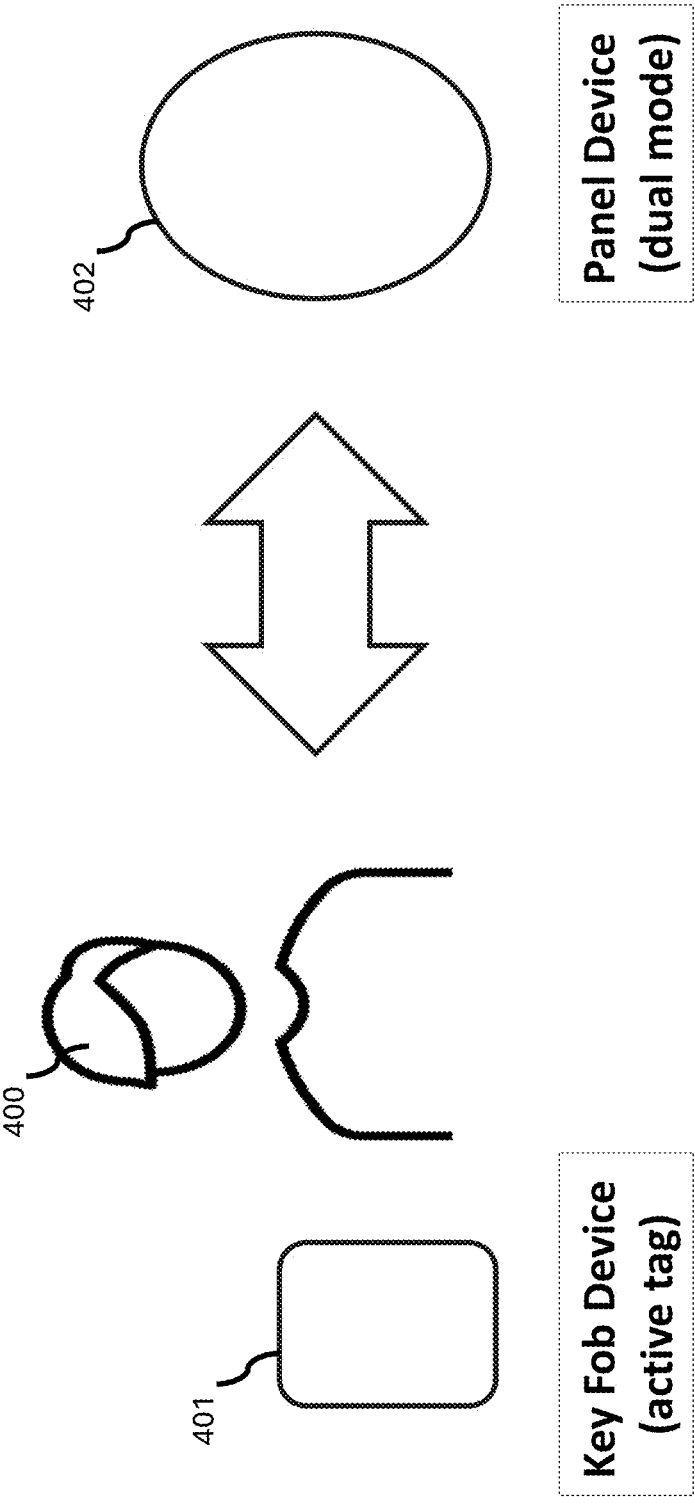
FIG. 4 illustrates a user carrying an active tag in communication with a panel device, in accordance with an implementation.

FIG. 4 illustrates a user 400 carrying an active tag 401 in communication with a panel device 402, in accordance with an implementation. An example of the active tag 401 is a key fob device. The active tag 400 communicates with the panel device 402 when it is in touch and/or is in proximity with the panel device 402. The panel device 402 acts as a transmitter, and the active tag 401 acts as a receiver. The panel device 402 operates in a first operating mode upon detection of a tactile action, and operates in a second operating mode upon detection of a proximity action.

In an implementation, in the first operating mode, the user 400 touches an exposed portion of the panel device 402, which causes the panel device 400 to generate and transmit a first signal for transmission to the active tag 401. The first signal is transmitted from the electronic device to the receiver through direct touch with the user's body 400. In other words, the user's body acts as an antenna and/or medium for the transmission of the signal from the panel device 402 depending on the location of the active tag 401. The signal is received by the active tag 401 placed in close proximity to the user's body (pocket, pendant, belt, or in a backpack or handbag carried by the user). As used herein "close proximity to the body" or like terms may refer to a distance where capacitive coupling occurs between the body of the user 400 and an antenna of the active tag 401 (e.g. in a user's pocket) and/or a distance from the users body where the active tag 401 is able to read the electromagnetic signal that the human body irradiates as an antenna (e.g., backpack).

It may be noted that when using capacitive coupling, the active tag 401 may be in close proximity (1-15 mm approximately) to the user's body and in a repeatable position in relation to the body's surface (collar, pendant, watch, tight pocket). Changes to its position may require recalibration of the active tag 401 and the panel device 402.

In an implementation, in a second operating mode, when the user 400 is in proximity with the panel device 402, the panel device 402 generates and transmits a second signal to the active tag 401 through air.

Figure 5:
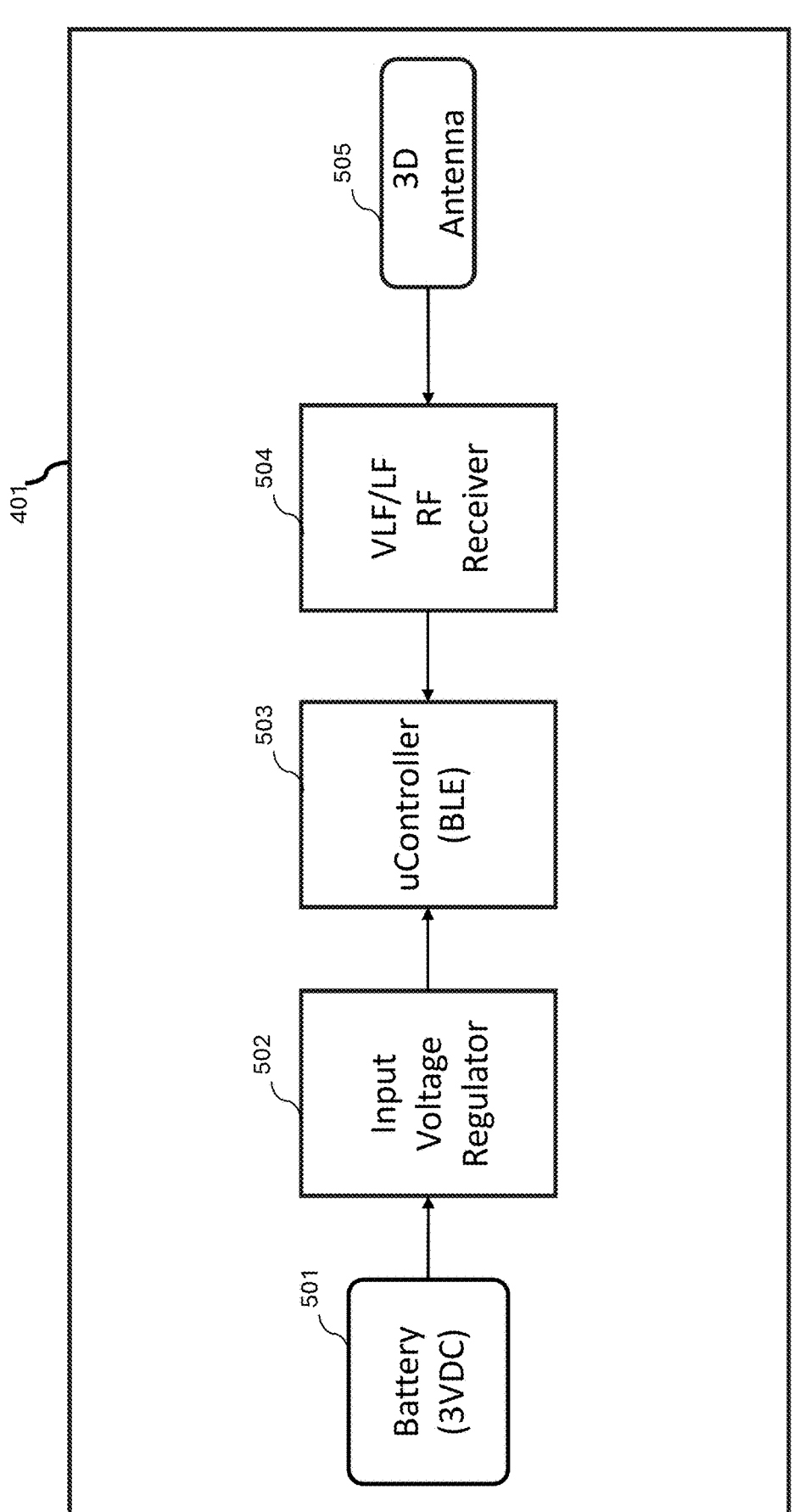
FIG. 5 illustrates a detailed schematic of the active tag, in accordance with an implementation.

FIG. 5 illustrates a detailed schematic of the active tag 401, in accordance with an implementation. The active tag 401 may include a battery 501, an input voltage regulator 502, a micro-controller 503, a VLF/LF RF receiver 504 for receiving signals through the 3D antenna 505.

Figure 6A:
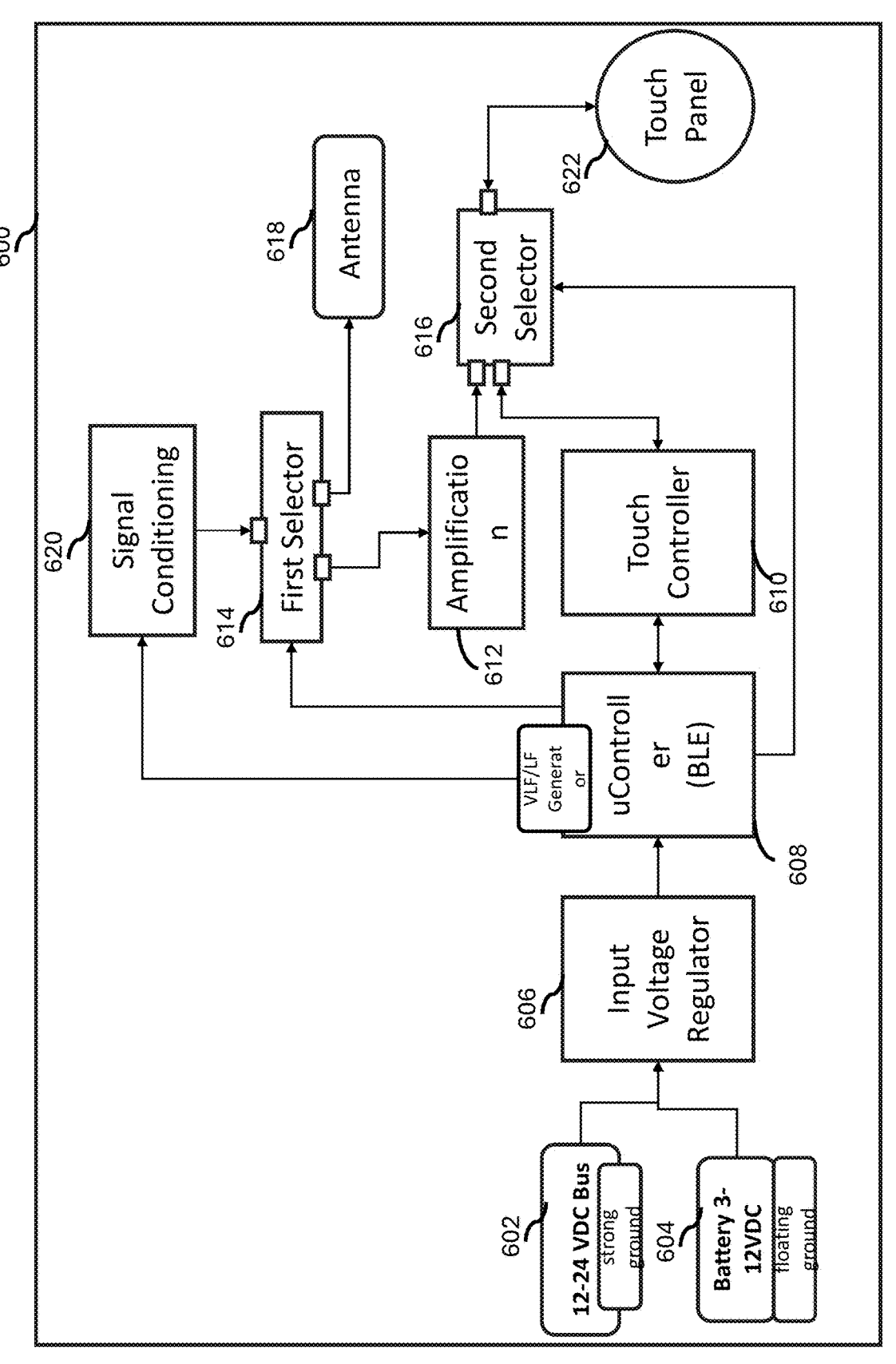
FIG. 6A illustrates a detailed schematic of a panel device illustrating two modes of operation, in accordance with an implementation.

FIG. 6A illustrates a detailed schematic of the panel device 600 (which is similar to the panel device 402) illustrating two modes of operation, in accordance with an implementation.

The panel device 600 may include a first input DC supply 602 with strong ground, a second input DC supply 604 with floating ground, an input voltage regulator 606, a micro-controller 608, a touch controller 610, an amplifier 612, a first selector 614, a second selector 616, an antenna 618, a signal conditioning circuit 620, and a touch panel 622. The micro-controller 608 is connected to the first and second selectors 614 and 616 to enable one of the first and second selectors 614 and 616, for example, to operate in one mode at a time.

Figure 6B:
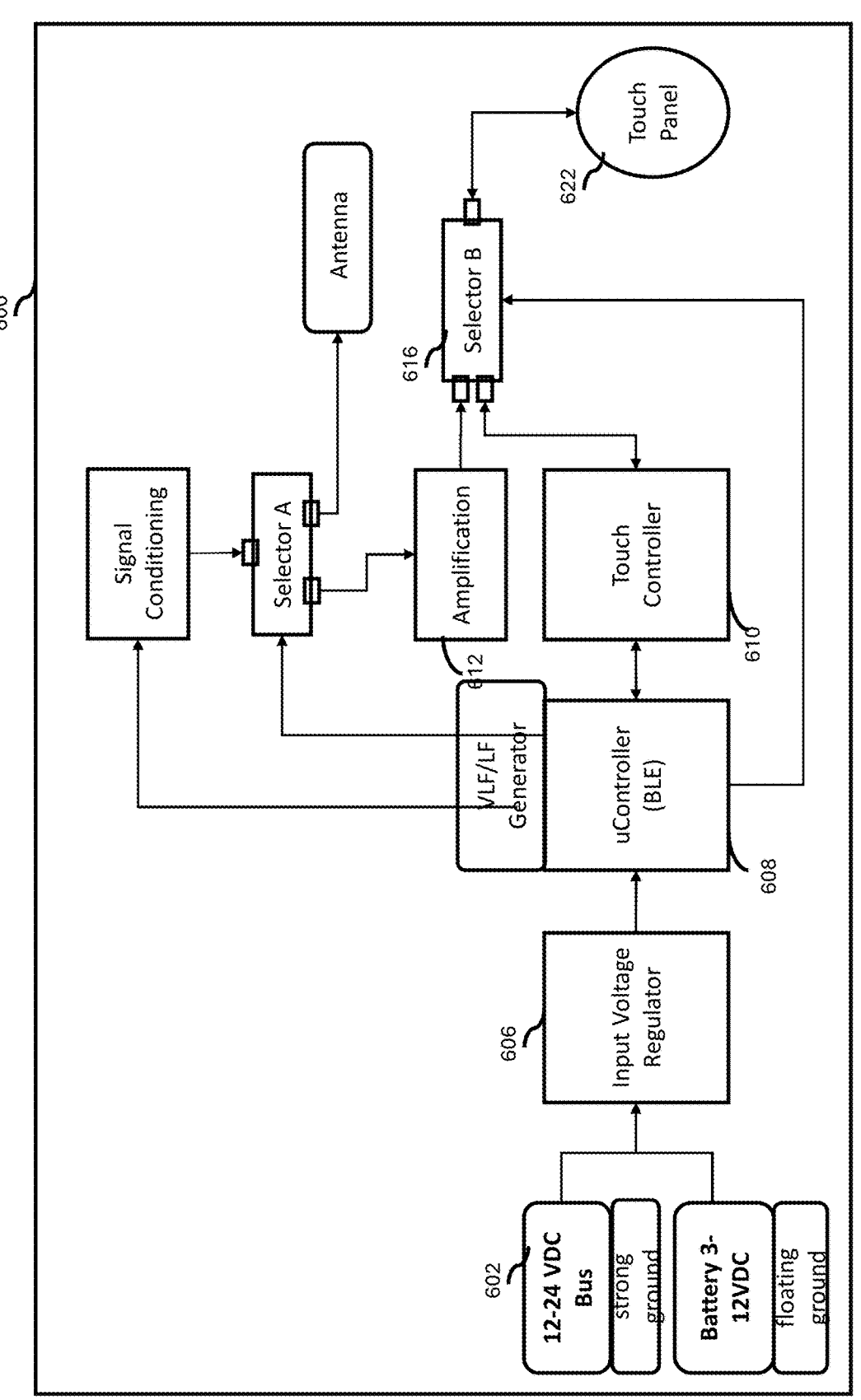
FIGS. 6B and 6C illustrate operation of a panel device in first and second operating modes respectively, in accordance with implementations.
Figure 6C:
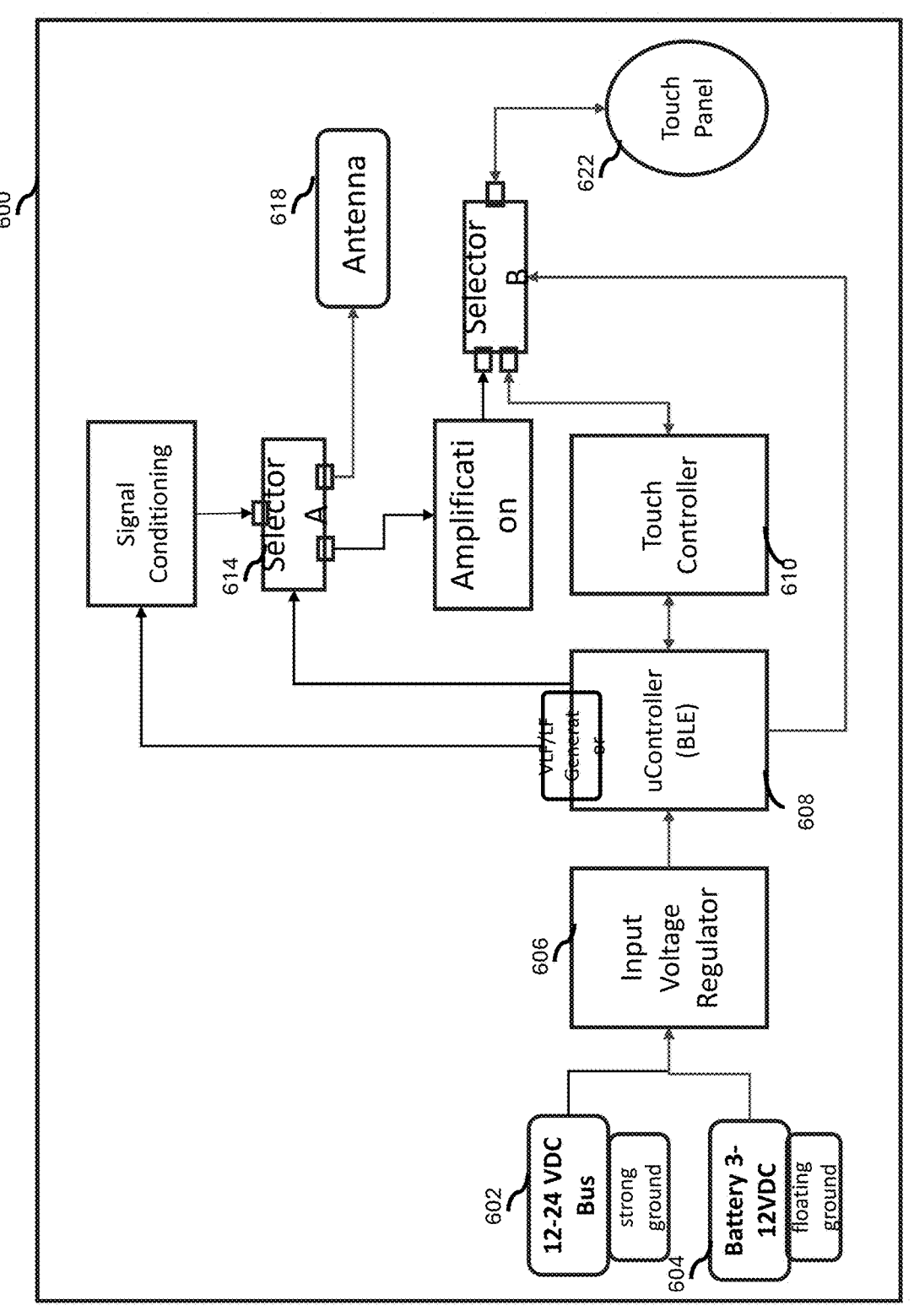

FIGS. 6B and 6C illustrate operation of the panel device 600 in first and second modes respectively.

In the first operating mode, the first signal travels between the active tag 401 and the panel device 600 through user's body, upon direct touch. In the first mode, the panel device 600 is connected to the first input DC supply 602, wherein the first input DC supply 602 may include a DC Bus with strong ground to facilitate optimal signal transmission through the user's body, and subsequent reliable and repeatable detection by the panel device 600. In some cases, when the second input DC supply 604 is selected in the first mode, an erratic behavior may occur, for example, if the system didn't have a repeatable performance due to changes in the user's clothing, user's position/posture, receiver location, environmental conditions (indoors/outdoors), etc. Implementations may A use an amplified VLF/LF signal, which has been found experimentally to improve the behavior.

In an implementation, in a default state, the panel device 600 sleeps (e.g., is in a low power consumption state) and may wake through the detection of a touch event detected by the touch controller 610 through the touch panel 622 formed of metal electrode plate.

Once a touch event is detected, the panel device 600 wakes up. The micro-controller 608 then configures the metal electrode plate as an output through the second selector 616 and transmits the VLF/LF signal. The VLF/LF signal is generated using a GPIO of the micro-controller module 608. The VLF/LF signal goes through conditioning and amplification, and then transmitted using the metal electrode plate on the touch panel 622. Once the transmission takes place, the controller 608 changes the state of the second selector 616 and goes back to sleep and waits for another proximity/touch event.

Using direct contact with the metal electrode plate in the touch panel 622 may provide relatively more flexibility in relation to proximity of the receiver (e.g., active tag 401) to the user's body compared to using capacitive coupling. Direct contact may further provide relatively more flexibility in relation to its relative position in relation to the body's surface For example, the active tag may be placed, for example, in a backpack, a handbag carried by the user, or the like.

In the second mode, the second signal travels directly between the panel's built in antenna 618 and an antenna of the active tag 401 through air. In the second mode, the input voltage regulator can be connected to either the first DC supply 602 or the second DC supply 604. In a default state, the panel device 600 sleeps (very low power consumption) and is woken up through the detection of a proximity event detected by the touch controller 610 through the metal electrode plate. Responsive to a detected proximity event, the panel device 600 wakes up, and enables the micro-controller 608 to generate the VLF/LF signal and set the first selector 614 to transmit the VLF/LF signal through the antenna 618. The VLF/LF signal may undergo signal conditioning and be transmitted using the antenna 618, which is then received by the antenna of the active tag 401. Once the transmission takes place, the controller 608 goes back to sleep and waits for another proximity/touch event.

Through experimental testing, it has been observed that by using the antenna 618 as compared to the human body, similar behaviour may be achieved by defining distance thresholds between the receiver (i.e. active tag) and trans-mitter (i.e the panel device) using the power of the signal. Due to the nature of the VLF/LF frequencies used thresholds may be defined/detected limiting transmission/reception ranges to distances as short as 30-50 cm (e.g., this distance may correspond to the arm reach of the user 400 when in contact with the panel device 600).

Further, a person ordinarily skilled in the art will appre-ciate that the various illustrative logical/functional blocks, modules, circuits, and process steps described in connection with the implementations disclosed herein may be imple-mented as electronic hardware, or a combination of hard-ware and software. To clearly illustrate this interchangeabil-ity of hardware and a combination of hardware and software, various illustrative components, blocks, modules, circuits, and steps have been described above generally in terms of their functionality. Whether such functionality is imple-mented as hardware, or a combination of hardware and software depends upon the design choice of a person ordi-narily skilled in the art. Such skilled artisans may implement the described functionality in varying ways for each par-ticular application, but such obvious design choices should not be interpreted as causing a departure from the scope of the present disclosure.

The process described in the present disclosure may be implemented using various means. For example, the appa-ratus described in the present disclosure may be imple-mented in hardware, firmware, software, or any combination thereof. For a hardware implementation, the processing units, or processors(s) or controller(s) may be implemented within one or more application specific integrated circuits (ASICs), digital signal processors (DSPs), digital signal processing devices (DSPDs), programmable logic devices (PLDs), field programmable gate arrays (FPGAs), proces-sors, controllers, micro-controllers, microprocessors, elec-tronic devices, other electronic units designed to perform the functions described herein, or a combination thereof.

For a firmware and/or software implementation, software codes may be stored in a memory and executed by a processor. Memory may be implemented within the proces-sor unit or external to the processor unit. As used herein the term "memory" refers to any type of volatile memory or non-volatile memory.

In the specification the terms "comprise, comprises, com-prised and comprising" or any variation thereof and the terms include, includes, included and including" or any variation thereof are considered to be totally interchangeable and they should all be afforded the widest possible interpre-tation and vice versa.

The disclosed technology is not limited to the implemen-tations hereinbefore described but may be varied in both construction and detail.

The invention claimed is:

1. A method for access control, comprising:

detecting a tactile or a proximity action by a body on a touch sensor of an electronic device;

generating, by the electronic device, a very low frequency (VLF)/low frequency (LF) signal upon detection of the tactile or proximity action;

transmitting the VLF/LF signal from the touch sensor to a receiver through the body in a first operating mode of the electronic device, wherein the receiver is located in close proximity to the body;

verifying by the receiver, an identity of the electronic device based on the VLF/LF signal;

transmitting by the receiver, an ultra high-frequency sig-nal (UHF)/high-frequency signal (HF) to the electronic device, upon successful verification of the electronic device; and performing, by the electronic device, one or more access control actions in response to the UHF/HF signal.

2. The method for access control of claim 1, further comprising:

transmitting the VLF/LF signal from an antenna of the electronic device to the receiver through air in a second operating mode, when the distance between the elec-tronic device and the receiver is in the range of 30-50 cm.

3. The method of claim 1, wherein said body acts as an antenna and/or conductive media for transmitting said VLF/LF signal to the receiver.

4. The method of claim 1, wherein the electronic device comprises an electronic lock and the receiver comprises an electronic key fob, wherein the electronic lock is engaged or disengaged in response to said UHF/HE signal from the electronic key fob.

5. The method of claim 1, wherein the VLF/LF signal is transmitted by the touch sensor of the electronic device, to an antenna of the receiver, when the receiver is positioned within a distance of approximately 1-15 mm from the body.

6. The method of claim 1, wherein the electronic device remains in sleep mode, and wakes up upon detection of a proximity or touch action by the body on the touch sensor.

7. The method of claim 1, wherein the electronic device includes the touch sensor formed of a metal electrode plate for detecting the tactile action, and transmitting the VLF/LF signal upon detection of the tactile or proximity action.

8. The method of claim 1, wherein the electronic device includes a signal conditioning and amplifier for performing signal conditioning and amplification of the VLF/LF signal prior to transmission from the touch sensor.

9. The method of claim 1, wherein in the first operating mode, the VLF/LF signal operates at a VLF frequency below approximately 30 KHz.

10. The method of claim 1, wherein the VLF/LF signal is transmitted from the touch sensor to the receiver, through direct touch between the touch sensor and the body, when the body is in contact with the touch sensor, and wherein the electronic device is connected to a power source that pro-vides an earth ground reference.

11. A system for access control, comprising:

an electronic device comprising:

a touch sensor for detecting a tactile or a proximity action by a body;

a VLF/LF signal generator for generating a VLF/LF signal upon detection of the tactile or proximity action, wherein the touch sensor is configured to transmit the VLF/LF signal to a receiver through the body in a first operating mode of the electronic device; and the receiver located in close proximity to the body and comprising:

a VLF/LF transceiver for receiving the VLF/LF signal and verifying an identity of the electronic device based on the VLF/LF signal; and an ultra-high frequency (UHF)/high-frequency (HF) transceiver for transmitting a UHF/HF signal to the electronic device, upon successful verification of the electronic device, wherein the electronic device includes corresponding UHF/HF transceiver for receiving and performing one or more access control actions based on the UHF/HF signal.

\* \* \* \* \*